Figures 1, 2:
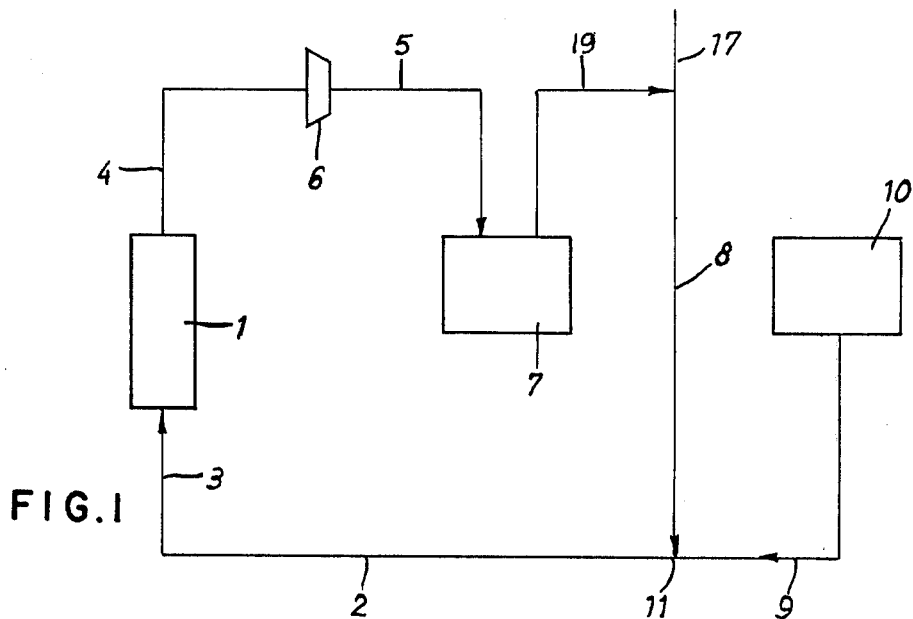

United States Patent [19]

Reimann

[11] 4,029,574

[45] June 14, 1977

[54] PROCESS AND APPARATUS FOR THE PURIFICATION OF ORGANICALLY CONTAMINATED SEWAGE

[75] Inventor: Hans Reimann, Pullach, Germany

[73] Assignee: Linde Aktiengesellschaft, Wiesbaden, Germany

[22] Filed: Sept. 18, 1972

[21] Appl. No.: 289,850

[30] Foreign Application Priority Data

Sept. 16, 1971 Germany .......................... 2146403

[52] U.S. Cl. .................................... 210/3; 210/15; 210/63 R; 210/195 R
[51] Int. Cl.² .......................................... C02C 1/06
[58] Field of Search .................. 210/3, 15, 63, 188, 210/195, 218

[56] References Cited
UNITED STATES PATENTS

| | | |
|---|---|---|
| 2,097,454 | 11/1937 | Fischer .......................... 210/188 X |
| 3,547,812 | 12/1970 | McWhirter ...................... 210/15 X |
| 3,577,678 | 5/1971 | Burton ................................ 210/3 X |
| 3,660,277 | 5/1972 | McWhirter et al. ........... 210/195 X |
| 3,670,887 | 6/1972 | McWhirter ...................... 210/15 X |
| 3,748,262 | 7/1973 | Lee et al. ...................... 210/218 X |

*Primary Examiner*—Frank A. Spear, Jr.
*Attorney, Agent, or Firm*—Millen & White

[57] ABSTRACT

An activated sludge process for the purification of sewage by aerating a sewage-activated sludge mixture with oxygen or oxygen-enriched air is described wherein at least a portion of the gaseous mixture exiting from the aeration tank is collected, at least a portion of gaseous metabolic product separated therefrom, and the purified gas recycled to the aeration tank. Concentration gradients of $O_2$ and gaseous metabolic products are thereby reduced, improving the efficiency of the sewage treatment processing, and pure $CO_2$ can be recovered as an end product.

15 Claims, 2 Drawing Figures

PROCESS AND APPARATUS FOR THE PURIFICATION OF ORGANICALLY CONTAMINATED SEWAGE

BACKGROUND OF THE INVENTION

This invention relates to a process and apparatus for the activated sludge purification of sewage by aeration of a sewage-activated sludge mixture with oxygen or oxygen-enriched air.

In the activated sludge process for oxidizing sewage, the sewage is brought into contact, in suitable tanks, with aerobic living bacteria which can be suspended in the water in the form of sludge flakes, together with the simultaneous introduction of oxygen. During this step, a portion of the impurities to be broken down is converted into a bacterial substrate and another portion is reacted with oxygen to form essentially $CO_2$ and water.

In most cases, the process is conducted by feeding air to an open activation tank by means of suitable aeration devices and mixing the air with the contents of the tank, so that the oxygen contained in the air is available to the bacteria in the aeration tank for respiration purposes.

One disadvantage of this process lies in poor utilization of the energy required during oxygen introduction, since a large portion of the oxygen and the entire nitrogen (78% by volume) of the air leaves the aeration tank after being used merely for intermixing the contents of the tank.

Due to economic considerations, it is impractical in this process to supply the tank with pure oxygen or with oxygen-enriched air, since here again the largest portion of the oxygen, obtained under energy expenditure, will escape unused. This is true even though pure oxygen or oxygen-enriched gas exhibits the advantage of providing a greater supply of oxygen to the tank and/or an increase in the oxygen concentration and thus an intensification of the purifying effect of the bacterial sludge.

In one attempt to overcome these difficulties, a "bio-precipitation" process has been described in Sewage Works Journal, September 1949, wherein the purification system consists essentially of two tanks. Sewage is enriched in oxygen in the first tank and then brought into contact with bacterial sludge in the second tank. This process has the disadvantage of separating the point where oxygen is introduced from the situs of oxygen consumption, whereby the concentration gradient of the oxygen, the most important factor of oxygen introduction, is diminished and consequently the oxygen activity is reduced. Furthermore, due to the limited solubility of oxygen, it is also necessary to provide an uneconomical water circulation cycle in order to meet the oxygen demand.

Another conventional process described in U.S. Pat. No. 3,547,811 utilizes closed aeration tanks which are subdivided into chambers. In this procedure, the sewage-activated sludge mixture flows successively through the several chambers where it is treated with a gas. Pure oxygen is fed to the first chamber, the exiting gas being partially recirculated in this chamber and partially conveyed to the second chamber, where it is again partially recirculated, and so forth. Finally, the gaseous mixture leaving the last chamber, insofar as it is not again recirculated therein, is exhausted to the atmosphere. This process has the disadvantage that the oxygen passing through the chambers is increasingly enriched in gaseous metabolic products, particularly $CO_2$, so that a concentration gradient occurs which is reduced in oxygen from stage to stage, resulting in reduced oxygen activity. Furthermore, this process entails incomplete oxygen exploitation, since marked amounts of oxygen must necessarily be discharged from the last stage. The sewage is also enriched with metabolic products, particularly $CO_2$, in the same manner, so that the bacterial sludge conveyed in parallel flow with the sewage is constantly exposed to a varying environment which results in reduced metabolic bacterial activity and thus reduced sewage purification.

A further disadvantage of this process is the relatively large capital and operating expenditures required for recirculating the activating gas in each one of the individual chambers.

OBJECTS OF THE INVENTION

Accordingly, it is a general object of this invention to provide an improved process and apparatus for the oxidation purification of sewage with activated sludge.

Another object of this invention is to provide a process for minimizing the oxygen concentration gradient in a continuous aeration process for purification of sewage with activated sludge.

A further object of this invention is to reduce the buildup of gaseous metabolic products in a continuous aeration process for purification of sewage with activated sludge.

An additional object of this invention is to provide a process for the economical recovery of biologically produced $CO_2$.

Other objects will be apparent to those skilled in the art to which this invention pertains.

SUMMARY OF THE INVENTION

The above and other objects are attained in one aspect of the present invention by providing a process and apparatus for an activated sludge process wherein sewage is oxygenated with oxygen or oxygen-enriched air in an aeration tank containing a sewage-activated sludge mixture which is characterized by:

a. collecting at least a portion of a gaseous mixture exiting from the oxygen aeration tank;

b. separating at least a portion of the gaseous metabolic products therefrom to form a purified gaseous mixture; and c. recycling the purified gaseous mixture to an inlet of the oxygen aeration tank to further oxygenate the sewage-activated sludge mixture.

BREIF DESCRIPTION OF THE DRAWINGS

The foregoing and other objects, features and advantages of this invention will become more fully apparent to those skilled in the art from the following Detailed Discussion, together with the annexed Drawings wherein similar reference characters refer to like or corresponding parts in the Figures, and in which:

FIG. 1 is a schematic diagram of one specific arrangement of an apparatus suitable for conducting the process of this invention; and FIG. 2 is a schematic diagram of another apparatus suitable for conducting the process of this invention.

DETAILED DISCUSSION

The process of this invention is applicable to all sewage treatment processes in which a sewage-activated sludge mixture is oxygenated by aeration with an oxygen-containing gas. The sewage mixture to be treated contains biodegradable organic compounds and can be sanitary or domestic sewage, industrial waste, storm sewage, or combinations thereof. Activated sludge mixtures are well known in the art and are granular flocculant suspensions of bacteria and protozoa having a moisture content of about 98%, e.g., secondary sludge.

The oxidation process is generally a secondary sewage treatment process, although it is equally applicable to activated sludge produced without preliminary separation. Briefly, the activated sludge process brings the biodegradable organic matter present in solutions or in suspension in the sewage into immediate contact with aerobic microorganisms seeded in the sludge; contact aeration is used to keep the biota suspension thoroughly mixed with oxygen and sewage. Aeration is effected by diffusing an oxygen-containing gas, e.g., air, into the liquid by means of various devices, e.g., filter plates, filter tubes, ejectors, jets, or mechanical agitation.

The present invention provides a process and apparatus for the purification of organically contaminated sewage which not only do not exhibit the disadvantages of prior art processes and apparatus, but which furthermore exploit the potential advantages of using oxygen or an oxygen-rich gas in the activated sludge sewage purification process.

Briefly, this is achieved by collecting, as cycle gas, the gaseous mixture exiting from the sewage-activated sludge mixture and containing oxygen and gaseous metabolic products of the activated sludge, especially $CO_2$; completely or partially separating therefrom the gaseous metabolic products contained therein, especially the $CO_2$; and thereupon reintroducing the thus-obtained oxygen-containing gaseous mixture into the sewage-activated sludge mixture.

The term "cycle gas" as used herein refers generically to the gaseous mixture entering the activated sludge tank and/or exiting therefrom, recognizing that its composition varies within one circulation path while passing through various process stages. The gaseous metabolic products are primarily $CO_2$ but generally include minor amounts of impurities such as hydrogen sulfide, ammonia, nitrogen and organic constituents.

According to another feature of the present invention, an amount of oxygen corresponding to the oxygen consumption of the sewage-activated sludge mixture is fed continuously in the form of oxygen-enriched gas. By the term oxygen-enriched gas as used herein is meant a gas composition containing at least 40 vol %, preferably at least 50 vol % molecular oxygen, the remainder being chiefly nitrogen or other inert gas.

It is now possible according to this invention to establish and maintain a large and essentially constant concentration gradient of oxygen between the gas-liquid interface and the surface of the bacterial cell while simultaneously avoiding an enrichment of the sewage-sludge mixture with metabolic products, especially $CO_2$, beyond the limit at which an inhibitory effect is produced on the biological functions of the bacteria and/or the biocenosis of the sludge.

Referring to FIG. 1, a suitable plant includes an activated sludge tank 1, a cycle gas purification plant 7, and an oxygen supply plant 10, all of conventional construction. Oxygen is fed from oxygen supply plant 10 via line 9, mixed with purified cycle gas from line 8 at 11, and the oxygen-enriched gas is fed via lines 2 and 3 to the gas intake of aeration tank 1. Cycle gas is taken from the aeration tank via discharge line 4 thru a blower 6 and via line 5 to cycle gas purification plant 7. Purified cycle gas is removed via line 19 and recycled thru conduit 8, while a small portion thereof is vented to the atmosphere thru line 17.

The aeration tank in conducting the process remains completely sealed. Feed and discharge lines mounted thereon for the cycle gas serve adequately to suply the activated sludge mixture. The separation of the metabolic products is effected by means of various essentially conventional procedures. Thus, the carbonic acid obtained herein can be separated, e.g., by condensative removal in regenerators, by adsorption in molecular sieve adsorbers or by absorption in scrubbers by means of suitable scrubbing liquids. In such processes, any $NH_3$ or $H_2S$ which may hae been concomitantly discharged is likewise removed.

In accordance with a further feature of this invention, it is advantageous, in order to prevent enrichment of oxygen-rich cycle gas with foreign gases, e.g., nitrogen and argon which are always present in certain concentrations in the cycle gas, to remove a partial stream of the cycle gas after passing through the aeration tank and preferably prior to feeding the fresh oxygen, e.g., by exhausting this partial stream into the atmosphere. The vented stream will generally but not necessarily represent 1 to 50 vol % of the recovered cycle gas.

The still remaining oxygen-containing portion of the branched-off partial stream can, after removal of the metabolic products, advantageously be fed directly to an air separation plant which is optionally located in the immediate vicinity of the clarification system. In this manner, losses of expensive oxygen are essentially completely avoided.

Another preferred and extremely economical embodiment of this invention resides in combining the cycle gas purification with oxygen production and/or the oxygen enrichment of the air by means of rectification. In this manner, it is possible to entirely separate the $CO_2$ or other metabolic products of the cycle gas, e.g., in the regenerators or reversing heat exchangers of a cryogenic air separation plant, so that an additional apparatus for cycle gas purification is eliminated.

In this embodiment, the cycle gas and/or a partial stream thereof, optionally after preliminary purification step, is fed together with the required amount of fresh air to an air separation plant. The oxygen-rich product of this plant is then utilized for feeding the aeration tank and/or for continuous after-enrichment of the cycle gas with fresh oxygen.

A further combination of cycle gas purification and oxygen production is achieved by using pressure-swing molecular sieve adsorbers to obtain oxygen-enriched air. Suitable pressure-swing molecular sieve gas adsorbers include but are not limited to such that contain synthetic zeolithes or special cokes. In these adsorbers, oxygen is separated from the larger nitrogen and $CO_2$ molecules. Due to the considerable difference in size between the oxygen and $CO_2$ molecules, the oxygen-rich phase is extensively freed of $CO_2$ by this procedure.

According to a further feature of the process of this invention, readily volatile, combustible, poisonous or odoriferous components enriched in the cycle gas, which would normally enter the atmospheric air or the aeration tank, are removed during the course of the process or are converted into harmless products. These components include but are not limited to hydrocarbons, chlorinated hydrocarbons, hydrogen sulphide and mercaptans. Suitable for this purpose are conventional techniques which include but are not limited to active carbon, thermal oxidation, catalytic oxidation, etc. Purification of the cycle gas to rid it of such components is advantageously conducted at a point just prior to its entrance into the air separation plant, discharge into the atmosphere or recycle into the aeration tank.

In the installation of large purification plants, it is advantageous to connect several aeration tanks in which the sewage can pass either in parallel or in series flow. The several tanks are connected in parallel to the main feed conduit for the cycle gas by means of distributing lines, and/or in parallel to the main discharge conduit of the cycle gas. The circulation of the gas is conveniently effected by a blower in the main conduit.

Referring briefly to FIG. 2, an arrangement of this sort is schematically illustrated, including three activated sludge tanks 1, 1' and 1'', a cycle gas purification plant 7, and an air separation plant 12. Oxygen from air separation plant 12 is fed via line 9, preferably mixed with a portion of purified cycle gas from line 15 and a portion of enriched cycle gas from line 18. The mixture passes via central supply line 2 to three parallel distribution conduits 3, 3' and 3'' by means of which the activated sludge tanks are supplied with oxygen-rich gas.

The gaseous mixtures exiting from the aerator tanks from lines 4, 4' and 4'' respectively, are collected in a central collection line 5, where blower 6 passes them to cycle gas purification plant 7, where $CO_2$ is separated and withdrawn in pure form via line 14.

The remaining purified cycle gas is collected in line 8 and divided into a major portion which flows thru conduit 15 and control valve 21 directly back to central supply line 2, and a minor portion fed via conduit 16 to air supply line 13 of separation plant 12.

The process of the present invention furthermore makes it possible to obtain $CO_2$ as the final product in the pure form, i.e., containing 90 to 99,5, preferably 95 to 99,5 mol % $CO_2$. Preferably a major portion, i.e., at least 50 mol % and especially at least 80 mol % of the $CO_2$ is separated from the collected gaseous mixture passing to the gas purification plant.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

The aeration tank 1 is supplied with an average amount of sewage of 7,300 m³/h. with, on the average, 390 g./m³ of $BOD_5$, wherein 85-90% of the $BOD_5$ is removed in an average residence time of 1.5 hour.

The cycle gas, containing approximately 56% oxygen, enters the aeration tank 1 in an amount of about 18,000 Nm³/h. via the conduits 2 and 3, where it is enriched with metabolic products, e.g., 3% of $CO_2$ and, in total, 10 p.p.m. $NH_3$, as well as about 5 p.p.m. of readily volatile, combustible, poisonous or odoriferous components. The thus-enriched cycle gas leaves the tank 1 and flows to the cycle gas purification plant 7, where it is extensively purified of these metabolic products. The cycle gas purification plant is conventional and can comprise a system of scrubbing columns, molecular sieve adsorbers, activated carbon adsorbers, apparatus for the thermal or catalytic oxidation, or the like.

Since the cycle gas, after leaving the tank 7 via line 19, is still enriched in oxygen at a concentration of about 50%, it is advantageous to recycle about 15,900 Nm³/h. of the thus-purified cycle gas via conduit 8 into feed line 2, while a small portion of 160 Nm³/h. is discharged into the atmosphere via line 17 to compensate for nitrogen buildup in the process.

In order to meet the oxygen consumption in activated sludge tank 1, approximately 2,100 Nm³/h. of about 98% oxygen is continuously fed via conduit 9 from an oxygen supply plant 10 and mixed with the cycle gas at 11.

EXAMPLE 2

A further exemplary embodiment of an apparatus of this invention suitable for conducting the process of the present invention is illustrated in FIG. 2, wherein the same amount of sewage is now distributed over three activated sludge aeration tanks 1, 1', 1''.

This apparatus comprises 3 parallel-connected partial cycles for the cycle gas. In a first partial cycle, 18,000 Nm³/h. of the cycle gas entering via conduit 2 containing approximately 56% $O_2$ is uniformly distributed to tanks 1, 1', 1'' by the three distribution conduits 3, 3', 3''. In these tanks, the cycle gas is enriched in metabolic products and other components, already mentioned above, and passes via discharge conduits 4, 4', 4'' into a central collection line 5. Blower 6 supplies the energy required to maintain the circulatory flow. 12,000 Nm³/h. of the enriched cycle gas is recycled directly into a central supply line 2 via conduit 18 and valve 20, whereas the remaining 4,000 Nm³/h. is fed directly to the cycle gas purification plant 7. The thus-cleansed stream of cycle gas, leaving the cycle gas purification plant 7 via conduit 8 is now again divided. 2,400 Nm³/h. flows, via conduit 15 and control valve 21, directly back into the central supply conduit 2, whereas the remaining 1,600 Nm³/h. is fed, via conduit 16, to the air supply line 13 of an air separation plant 12. This plant may be of the conventional type: air and recycle stream are compressed, freed from $H_2O$ and $CO_2$, cooled in heat exchange with product streams and expanded into a column, where partial liquefaction and rectification is effected, to yield a gaseous oxygen product of relatively high purity. On the other side the plant may be of the pressure swing type: two or more adsorbent vessels are in a cyclic manner first provided with compressed air, whereafter the pressure is lowered in the next cycle, whereby an oxygen-enriched stream is diverted in the compression or the decompression cycle-depending on the nature of the adsorbent.

3,300 Nm³/h. of the product of this plant, enriched with oxygen to a content of 85%, is continuously supplied to the central feed line 2 via conduit 9, in order to meet the oxygen demand in the aeration tanks 1, 1', 1''.

The valves 20 and 21 of conduits 18 and 15 make it possible to regulate the individual streams in a economically advantageous manner. According to this embodiment, the process can thus be conducted with a maximum degree of efficiency from the viewpoints of economy and purification technology, without any oxygen loss by the discharge of partial quantities of cycle gas into the atmosphere. Furthermore, pure $CO_2$ can be withdrawn from the clarification plant via conduit 14 as a final product, e.g., in an amount of 300 $Nm^3/h$. of pure $CO_2$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an activated sludge process wherein sewage is oxygenated with oxygen or oxygen-enriched air containing at least 40% oxygen in an aeration tank containing a sewage-activated sludge mixture, the improvement which comprises:
   a. collecting at least a portion of a gaseous mixture exiting from the aeration tank said gaseous mixture containing unconsumed oxygen and gaseous metabolic products, primarily $CO_2$;
   b. separating at least a major portion of said $CO_2$ present in said gaseous metabolic products from said gaseous mixture by condensation, adsorption or scrubbing to form a purified gaseous mixture containing oxygen; and
   c. recycling the purified gaseous mixture containing oxygen to an inlet of the aeration tank to further oxygenate the sewage-activated sludge mixture therein, and adding makeup oxygen in an amount corresponding to the oxygen consumption of the sewage-activated sludge mixture to maintain the at least 40% oxygen concentration in the aeration tank.

2. A process according to claim 1 further comprising venting a portion of said purified gaseous mixture from the sewage treatment system to prevent a build-up of nitrogen in said gaseous mixture.

3. A process according to claim 1 further comprising feeding at least a portion of the purified gaseous mixture to an air separation plant, separating oxygen therefrom, and using said oxygen as a source of gaseous oxygen fed to said oxygen aerator tank.

4. A process according to claim 3 wherein said separation is effected cryogenically.

5. A process according to claim 3 wherein said separation is effected by pressure change adsorption.

6. A process according to claim 3 wherein the oxygen-rich gaseous product is fed directly to said oxygen aeration tank.

7. A process according to claim 1 further comprising recovering said $CO_2$ in the pure form.

8. A process according to claim 7 further comprising separating said collected gaseous mixture into two portions, conducting the separation of said $CO_2$ in the gaseous metabolic products from one portion prior to recycling, and recycling the other portion to said oxygen aeration tank without separating gaseous metabolic products therefrom.

9. A processs according to claim 8 further comprising adding gaseous oxygen in an amount corresponding to the oxygen consumption of the sewage-activated sludge mixture to at least one of said two portions before recycling that portion to the oxygen aeration tank.

10. A process according to claim 9 wherein gaseous oxygen is added to said other portion of said gaseous mixture.

11. A process according to claim 10 wherein gaseous oxygen is added in the form of a gas composition consisting of at least 50 vol % oxygen.

12. A process according to claim 1 further comprising treating at least a portion of said collected gaseous mixture to remove volatile, odiferous or poisonous components therefrom.

13. Apparatus suitable for conducting a process according to claim 1 comprising at least one activated sludge tank, a blower, $CO_2$ separation means, said means comprising condensation means, adsorption means or stripping means, and means for the production of oxygen or oxygen-enriched air, wherein the activated sludge tank, the blower and the $CO_2$ separation means are connected in series, and the means for the production of oxygen is in communication with an inlet to the activated sludge tank and with a conduit leading from the $CO_2$ separation means.

14. Apparatus according to claim 13, wherein said means for the production of oxygen or oxygen-enriched air is a cryogenic air separation plant.

15. A process according to claim 1, further comprising adding gaseous oxygen to the purified gaseous mixture in an amount corresponding to the oxygen consumption of the sewage-activated sludge mixture before recycling the purified gaseous mixture to the aeration tank.

* * * * *